April 14, 1925.  1,533,511

L. A. NEMETZ

GRAIN DRYING DEVICE

Filed Nov. 14, 1922  2 Sheets-Sheet 1

Inventor
Louis A. Nemetz

By Philip A. Terrell
Attorney

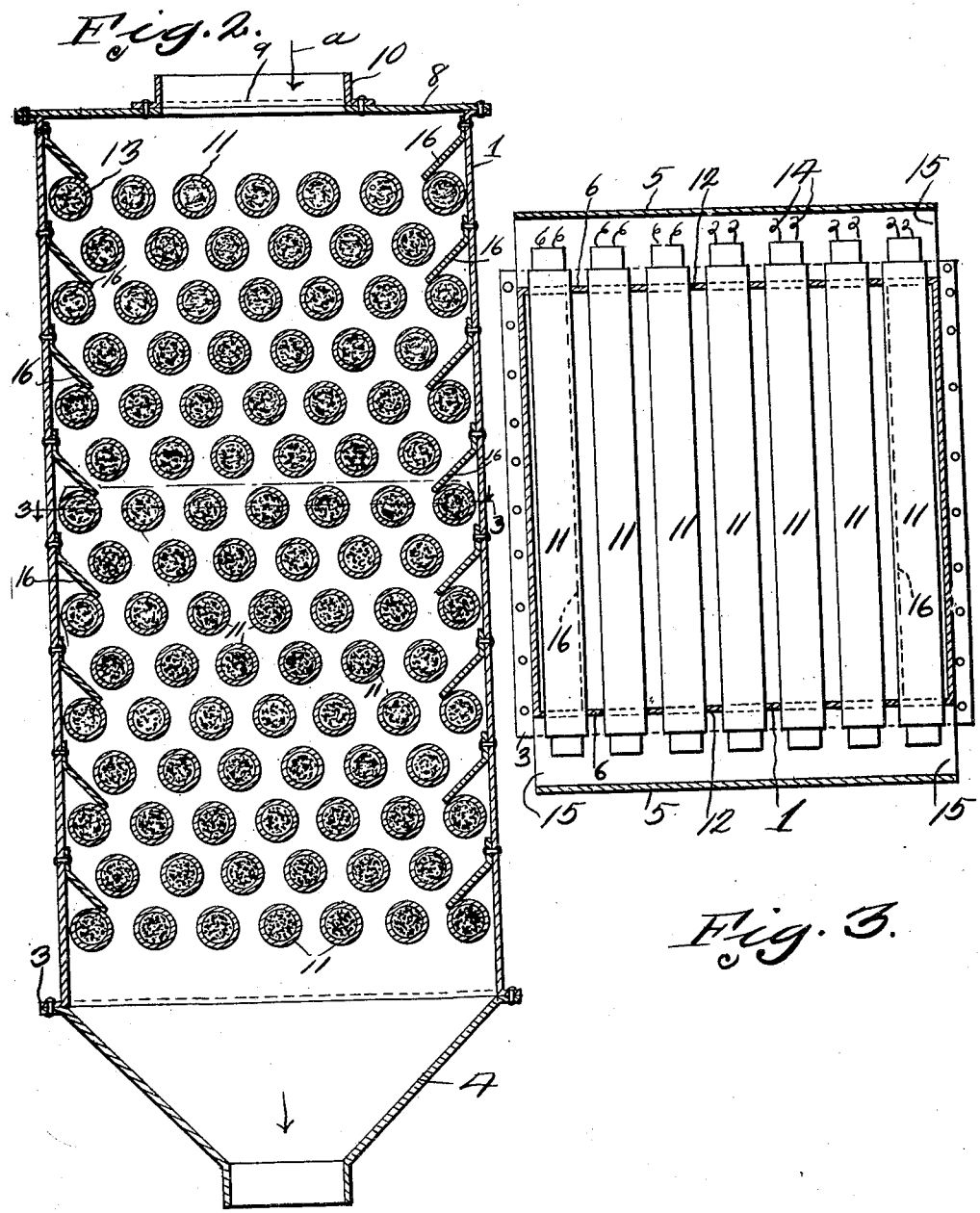

Patented Apr. 14, 1925.

1,533,511

UNITED STATES PATENT OFFICE.

LOUIS A. NEMETZ, OF OMAHA, NEBRASKA.

GRAIN-DRYING DEVICE.

Application filed November 14, 1922. Serial No. 600,893.

*To all whom it may concern:*

Be it known that LOUIS A. NEMETZ, citizen of the United States, residing at Omaha, in the county of Douglas and State of Nebraska, has invented certain new and useful Improvements in Grain-Drying Devices, of which the following is a specification, reference being had therein to the accompanying drawings.

The invention relates to grain drying devices and has for its object to provide a device of this character wherein a container, through which grain passes, is provided with a plurality of horizontally and transversely disposed heating elements, preferably round in cross section, which elements are provided with electric resistances whereby they are heated, and the grain passing through the devices engages the same and is dried.

A further object is to provide the side walls of the device with deflecting plates, preferably in parallel relation to the heating elements and forming means for deflecting the grain which passes adjacent opposite walls of the device into engagement with the heating elements.

A further object is to dispose the heating element in super-imposed horizontal series, the adjacent series of elements being in staggered relation, thereby insuring contact with all the grain which passes through the device.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 2 is a vertical transverse sectional view through the device taken at a right angle to that shown in view 1.

Figure 3 is a horizontal sectional view through the device taken on line 3—3 of Figure 2.

Figure 1:
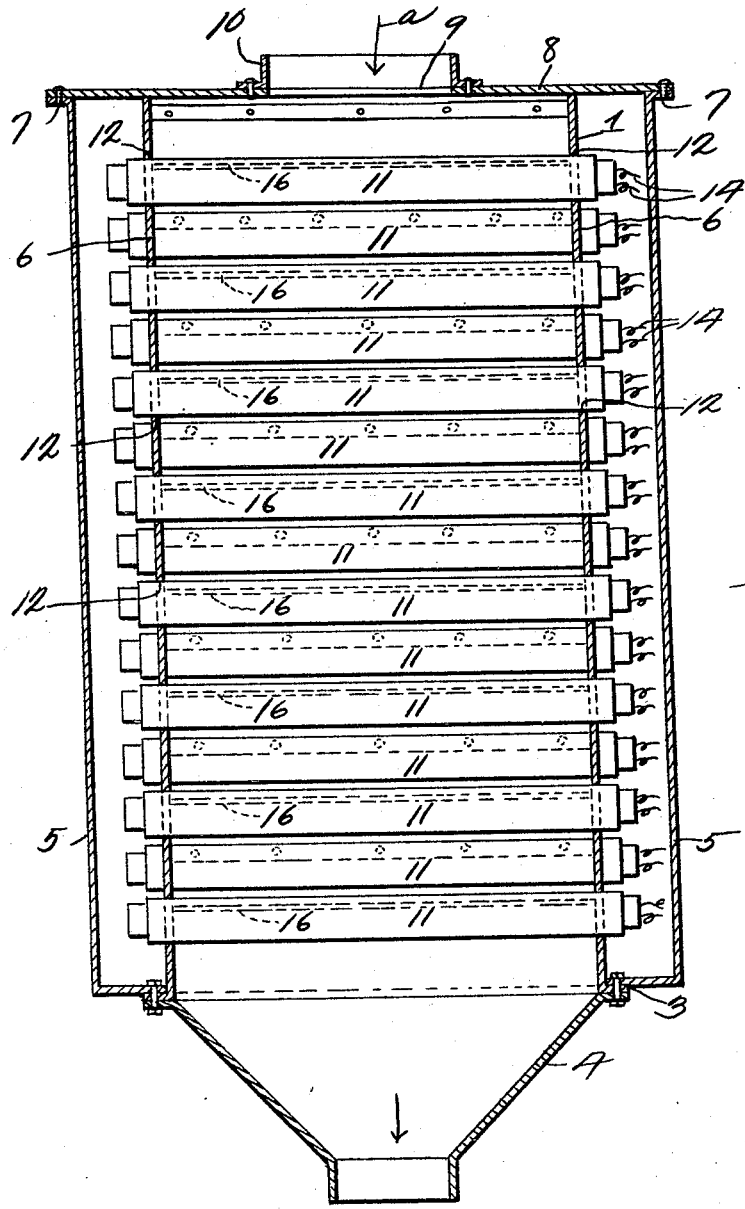
Figure 1 is a vertical transverse sectional view through the device.

Referring to the drawings, the numeral 1 designates the rectangular shaped casing, the lower end of which is provided with a flange 3, to which flange is secured a restricted discharge chute 4, through which grain passes to bins or to any other suitable place. Secured to the flange 3 at opposite sides of the casing 1 are offset walls 5, which are in parallel relation to the opposite walls 6 of the casing 1. Disposed on the upper end of the casing 1 and secured to the upper ends of the walls 5 at 7 is a plate 8, which plate is provided with an intake opening 9, through which grain, preferably wheat passes, for drying purposes, said plate 8 is also provided with a pipe 10 through which pipe and opening 9 grain may be fed to the device. Extending transversely of the casing 1 are horizontally disposed preferably round heating elements 11, the ends of which elements extend through apertures 12 in the walls 6, and are arranged in horizontal rows as shown in Figure 2, however the adjacent rows are in staggered relation thereby insuring the engagement of all of the grain with the heating element as it passes through the device in the direction of the arrows *a*, in Figures 1 and 2. The heating elements 11 have resistances 13 therein, which cause the elements to become heated when current passes through the wires 14. It will be seen that grain, preferably wheat, in passing through the device, will be thoroughly dried by contact with the heating elements and by heat radiated therefrom. The length of the device will vary according to the size of the device, or the kind of grain being dried.

By providing the walls 5, the wiring of the heating elements is protected and they also form deflecting means for deflecting the heat to the open side 15, as well as prevent removal of the heating elements 11. To prevent grain from passing between the outer heating elements and the walls of the casing 1, a plurality of downwardly and inwardly inclined deflecting plates 16 are provided, which plates are in parallel relation to the heating elements 11 and are disposed above the outer heating elements and extend inwardly over the same, therefore it will be seen that grain which approaches the walls of the casing, which are in parallel relation to the heating elements will be deflected inwardly between the heating elements where it will be thoroughly dried.

From the above it will be seen that a grain drying device is provided, which device is simple in construction, electrically heated and one wherein the parts may be easily reached for repair and assembling purposes.

The invention having been set forth what is claimed as new and useful is:—

1. A grain drier comprising a casing, a plurality of independent removable electric heating elements extending transversely through said casing between intake and discharge openings and forming means whereby grain passing through the device will engage the heating elements and be dried.

2. A grain heating device, said device comprising a casing, a plurality of horizontally disposed independently removable electric heating elements extending transversely through the casing and supported in opposite walls thereof, said heating elements being arranged in horizontal rows, the adjacent rows being in staggered relation to each other.

3. A grain drying device, said device comprising a casing rectangular shaped in horizontal cross section, horizontally and transversely disposed independently non-connected electric heating elements extending through the casing and supported in opposite walls thereof, said heating elements being arranged in horizontal rows, the adjacent rows being in staggered relation, downwardly and inwardly inclined deflecting plates in substantial parallel relation to the heating elements and carried by opposite walls of the casing, said deflecting plates being disposed above the outer heating elements.

4. The combination with transversely disposed independent and horizontally removable heating elements, said elements being disposed in a casing of a grain drying device, of deflecting plates carried by opposite walls of the casing and extending inwardly above the adjacent heating elements and forming means for deflecting grain inwardly into engagement with the heating elements and vertically disposed plates being movably attached to the opposite sides of the casing and housing the ends of the heating elements.

In testimony whereof I hereunto affix my signature.

LOUIS A. NEMETZ.